Nov. 28, 1967   J. F. SWIFT   3,354,977
VEHICLE WITH SELECTIVE HYDRAULIC DRIVE MEANS
Filed June 22, 1965   2 Sheets-Sheet 2
NEUTRAL
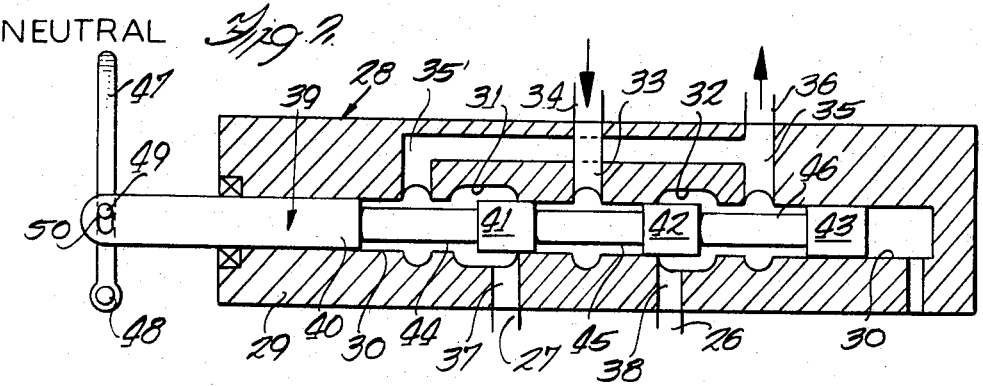
FORWARD DRIVE
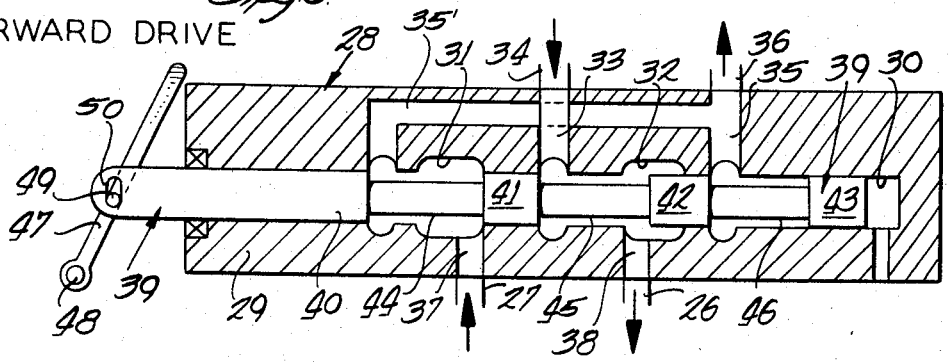
REVERSE DRIVE
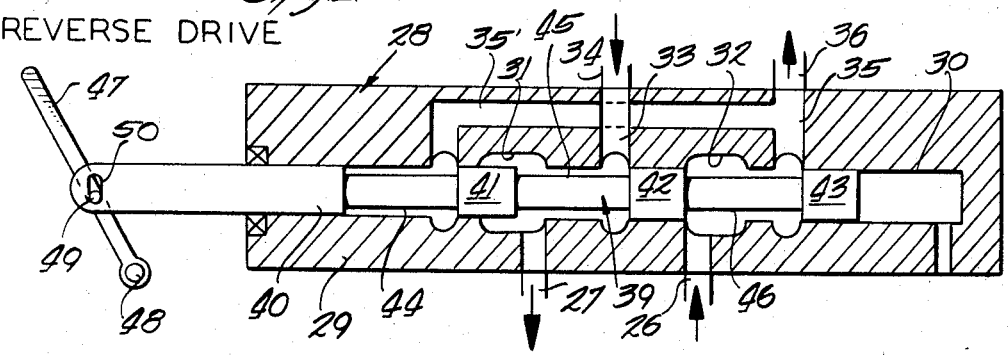

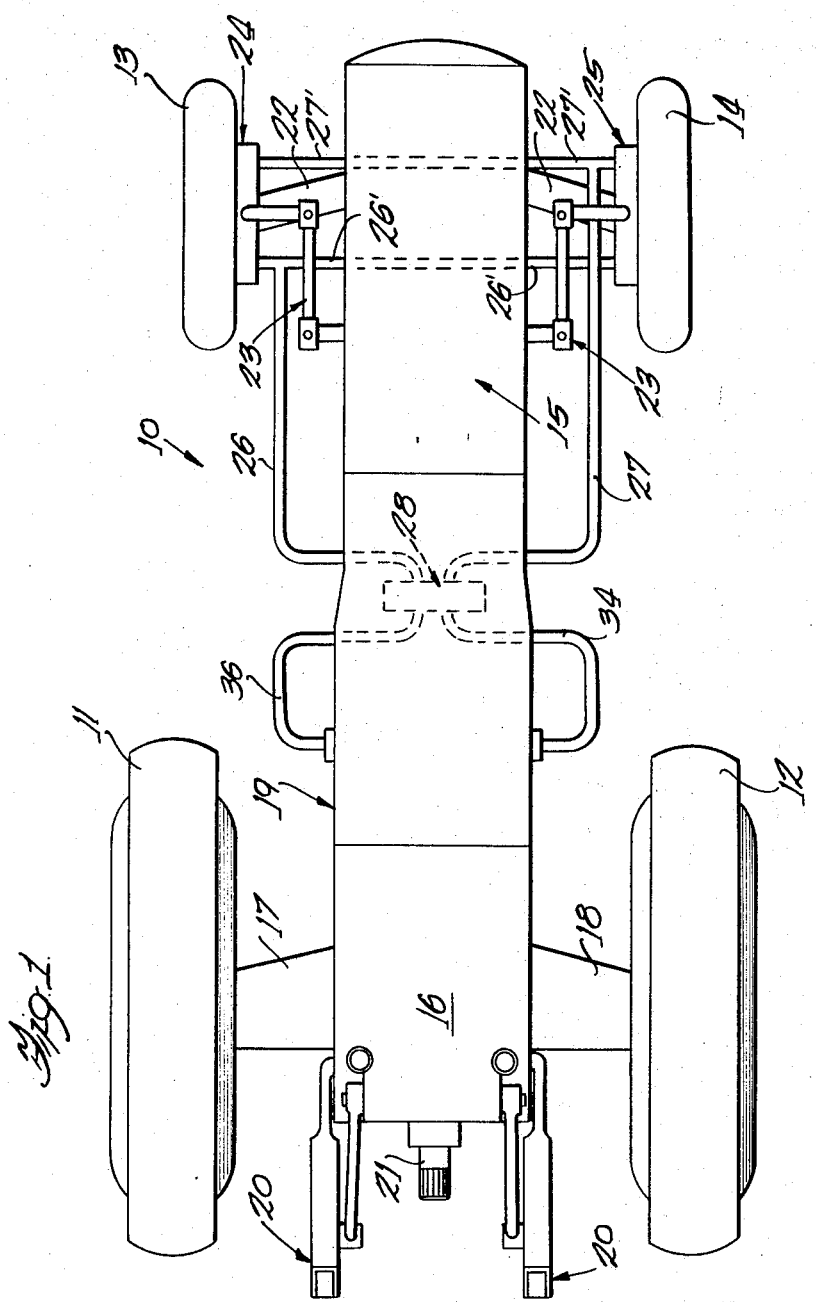

United States Patent Office 3,354,977
Patented Nov. 28, 1967

3,354,977
VEHICLE WITH SELECTIVE HYDRAULIC DRIVE MEANS
John F. Swift, Chicago, Ill., assignor to International Harvester Company, a corporation of Delaware
Filed June 22, 1965, Ser. No. 465,862
9 Claims. (Cl. 180—44)

ABSTRACT OF THE DISCLOSURE

A self-propelled vehicle combination employing a hydromechanical power transmission unit having split-path power train and equipped with a source of fluid pressure power-take-off means, connected to the vehicle's power plant to drive hydromechanically a first ground-engaging element for operations of the vehicle requiring normal tractive effort; and a second ground-engaging element in hydrostatic drive relation with an auxiliary hydraulic motor energized selectively by the aforesaid source of fluid pressure power-take-off to augment optionally the vehicle's traction driving operations requiring higher tractive effort.

This invention relates to means for propelling a vehicle employing a hydraulic power transmission in the power train from the vehicle's power plant to its ground-engaging elements. More in particular this invention relates to a tractor having an infinitely variable speed ratio reversible hydromechanical power transmission with high pressure fluid power take-off means for driving one pair of ground-engaging wheels hydromechanically and selectively driving another pair of ground-engaging wheels hydrostatically by employing fluid under pressure from said fluid power take-off of said hydromechanical power transmission.

Hydromechanical power transmissions differ from hydrostatic power transmissions in at least one major respect. Transmission of power in a hydrostatic transmission is entirely dependent upon the flow of hydraulic fluid under pressure under all operating conditions. Contrary to that of a hydrostatic power transmission a hydromechanical power transmission is provided with mechanical force reacting means which in effect divides the power train into two separate paths, one being mechanical and the other hydraulic. When the working fluid circuit of a hydromechanical power transmission is under hydraulic lock under one operating condition (i.e., no fluid flow) the power transmitted hydrostatically is zero but the mechanical force reacting means drivingly connects the input shaft to the output shaft whereby all power is transmitted mechanically. At all other operating conditions or speed ratios, the power transmitted from the input shaft to the output shaft is partly hydrostatic and the balance mechanical. Since it is well known that hydraulic power transmissions are significantly lower in efficiency than mechanical power transmission, it can be appreciated that a hydromechanical power transmission, wherein part or all of the power is transmitted mechanically, the efficiency will be appreciably higher than that of a hydrostatic transmission and yet operable at infinitely variable speed ratio.

As an example of a mechanical force reacting means characteristic of hydromechanical power transmissions reference is made to my United States Letters Patent o. 3,151,456 wherein it will be seen that the pump swash plate 47 and the motor swash plate 113 are both constrained for rotation with the output shaft 41, 41' and associated rotatable valve plate 39 of the hydromechanical power transmission 15. The pump cylinder block 30 is constrained for rotation with the input shaft 23 by the bell-shaped pump carrier 27. From this it will be apparent that when the pump swash plate 47 is tilted for positive displacement any resistance to reciprocation by the pump pistons 32 reacts as a mechanical force against the pump swash plate 47 tending mechanically to rotate it and thus drive its associated output shaft 41. It will also be apparent that if the motor swash plate 113 is then set vertically (i.e., zero motor displacement) the motor will accept no hydraulic fluid from the pump and neither the pump pistons 32 nor the motor pistons 106 can reciprocate for a state of hydraulic lock exists. Therefore no power is transmitted hydrostatically for there is no fluid flow. However, in such condition all power is mechanically transmitted from the input shaft 23 to the output shaft 41 because mechanical force is reactively transmitted from the pump cylinder block 30 through the then non-reciprocable pump pistons 32 to the tilted pump swash plate 47 thereby mechanically driving the pump swash plate 47 at the same speed and direction as that of the pump cylinder block 30. Thus the output shaft 41 is driven entirely mechanically at the same speed and direction as that of the input shaft 23.

In my United States Letters Patent No. 3,151,456 there is also shown and described a hydromechanical power transmission having the unique feature of providing a high fluid pressure power-take-off means from the working circuit thereof. Likewise the copending application for United States Letters Patent of John F. Swift and William Margolin, Ser. No. 384,472, filed on July 22, 1964, since issued as Patent No. 3,213,620, and assigned to the same assignee herein, also illustrates and describes a hydromechanical power transmission having a high pressure fluid power-take-off means from its working circuit. It is a necessary requirement of the present invention that a hydromechanical power transmission having a fluid power-take-off means be employed as a source of fluid under pressure power and hence either hydromechanical power transmission of the above mentioned two disclosures will be satisfactory for the purposes herein.

Wheel type tractors are usually propelled through the rear wheels thereof and this is satisfactory for most operating conditions. However, in some instances, particularly where the terrain is wet or muddy, icy or slopes upwardly in steep grade, the tractor's rear wheels drive traction is insufficient for satisfactory operation. In such instances it is highly desirable to drive the tractor's front wheels as well as the rear wheels (i.e., selective front wheels drive to augment rear wheels drive) thereby increasing traction. It is therefore a prime object of the present invention to provide a vehicle having a first pair of tractive wheels driven by the vehicle's engine through a hydromechanical power transmission with fluid power-take-off wherein the said fluid power-take-off is utilized to energize a second pair of ground-engaging wheels hydrostatically.

Another important object of this invention is to provide a vehicle, according to the preceding object, having a control valve means for selectively energizing and de-energizing said second pair of wheels.

Still another important object of this invention is to provide a vehicle, according to the preceding objects, wherein said second pair of wheels are freely rotatable when the hydrostatic drive therefor is de-energized.

These and other important and desirable objects inherent in and encompossed by the invention will be more readily understood from the ensuing description of an embodiment thereof, the appended claims and the annexed drawings, wherein:

FIGURE 1 is a diagrammatic plan view of a wheel type tractor vehicle illustrating the general arrangement of components necessary to the present invention;

FIGURE 2 is a side elevation in section taken along the longitudinal axis of a control valve showing the position of the valve plunger thereof when the valve is in neutral or by-pass condition;

FIGURE 3 is similar to FIGURE 2 except that the position of the valve plunger is shown for energizing the hydrostatic drive motors in the forward direction;

FIGURE 4 is similar to FIGURE 2 except that the position of the valve plunger is shown for energizing the hydrostatic drive motors in the reverse direction.

With continued reference to the drawings in FIGURE 1 the numeral 10 indicates a tractor type vehicle. Of course, it will become apparent that the vehicle 10 may be some other type of wheeled vehicle such as, for example, a truck, bus, or automobile.

The vehicle 10 includes rear ground-engaging wheels 11 and 12 as well as front ground-engaging wheels 13 and 14. The forward or front portion of the vehicle 10 includes a power plant, generally indicated at 15, which usually is the form of an internal combustion engine of the gasoline or diesel type. The rearward portion 16 of the vehicle 10 includes axle housings 17 and 18, the axles therein (not shown) being connected in drive relation to the wheels 11 and 12 in a conventional manner.

Centrally located on the vehicle 10 is an infinitely variable speed ratio hydromechanical power transmission unit generally indicated at 19. As stated previously the hydromechanical power transmission 19 employed herein must necessarily be of the type which is provided with fluid pressure power-take-off means such as that described in the aforementioned two patent disclosures. The power input shaft (not shown) of the transmission 19 is in drive relation with the power plant 15 and the output shaft (not shown) is in drive relation with the rear wheels 11 and 12 through a differential (not shown) as is conventionally known. Thus the transmission 19 is capable of connecting the rear wheels 11 and 12 with the engine 15 in drive relation whereby the vehicle 10 is propelled along the ground. Where the vehicle 10 is an agricultural tractor it may be provided with a conventional hitch mechanism, indicated at 20, and a conventional power-take-off shaft 21 mounted on the rearward portion 16 as shown.

The forward portion of the vehicle 10 includes a front axle 22 upon which the front wheels 13 and 14 are mounted in journalled relation in a conventional arrangement. The front wheels 13 and 14 are steerable through conventional steering linkages as indicated generally at 23.

Mounted on the steerable front wheel 13 is a hydraulic motor indicated at 24. In a similar manner the front wheel 14 is also provided with a hydraulic motor 25. The hydraulic motor 24 is connected to the wheel 13 such that when energized it drives rotatively the wheel 13. Similarly when the hydraulic motor 25 is energized it drives rotatively the wheel 14. The hydraulic motors 24, 25 are of conventional construction and may be of fixed displacement or variable displacement as may be desired. The hydraulic motors 24, 25 may, if desired, be connected hydraulically in parallel relation through conduits 26, 26' and 27, 27' as shown in FIGURE 1 wherein one of the conduits 26 or 27 is communicatively connectable to a source of fluid under pressure and the other conduit serves as a low pressure fluid return means as is well known. If desired a more sophisticated type of hydraulic system may be employed to energize the hydraulic motors 24, 25 such as that, for example, shown and described in U.S. Patent No. 3,114,424 issued to C. Voreaux et al.

In order to energize controllably the hydraulic motors 24, 25 a hydraulic control valve generally indicated at 28 is provided. In FIGURES 2, 3 and 4 it will be seen that the control valve 28 comprises a casing 29 having a longitudinal bore 30 therein as shown. The casing 29 is provided with annular grooves 31, 32 along the bore 30 as indicated. The casing 29 is provided with a high pressure fluid inlet passage 33 leading to the bore 30 and communicatively connected through conduit 34 to the outlet side of the fluid power-take-off means of the hydromechanical power transmission 19. In addition the casing 29 includes low pressure fluid passages 35, 35' leading to the bore 30 as shown and communicatively connected through conduit 36 to the low pressure inlet side of the fluid power-take-off means of the hydromechanical power transmission 19.

The casing 29 is provided with motor ports 37, 38 as shown. The motor port 37 communicates with the annular groove 31 and conduit 27 while motor port 38 communicates with annular groove 32 and conduit 26 as indicated.

Disposed within the bore 30 in a slidable relation is a valve element or plunger indicated generally at 39. The plunger 39 includes lands 40, 41, 42 and 43 forming circumferential grooves 44, 45 and 46 therebetween as shown in FIGURES 2, 3 and 4. The plunger 39 protrudes externally of the casing 29 and operatively connects to a control lever 47. The control lever 47 conveniently is pivotally mounted at 48 to a stationary member of the vehicle 10 and operatively connected to the plunger 39 by a pivot pin 49 mounted thereon in engaging relation with an elongated hole 50 disposed in the externally protruding end portion of the plunger 39 as shown. Thus an arcuate movement of the control lever 47 correspondingly moves the plunger 39 longitudinally within the bore 30 as is evident from FIGURES 2, 3 and 4. The operation of the control valve 28 for controllably energizing the hydraulic motors 24, 25 for driving the wheel 13, 14 from the fluid power-take-off means of the hydromechanical power transmission 19 will now be described.

When the vehicle 10 is operating normally the power plant 15 propels the vehicle by driving the rear ground-engaging wheel 11, 12 through the hydromechanical transmission 19 and the front wheels 13, 14 rotate freely (i.e., not driven by the engine 15). During such operation the control valve 28 is in neutral position as illustrated in FIGURE 2. When the control valve 28 is in the neutral position no fluid flow occurs in the high pressure inlet passage 33 for the circumferential groove 45 is not in registry with any other port. Hence the hydromechanical power transmission 19 delivers no fluid power from its fluid power-take-off means. Since rotation of the front wheels 13, 14 during movement of the vehicle 10 drives the hydraulic motors 24, 25 the motors 24, 25 would function as hydraulic pumps unless they were of the variable displacement type and their displacement was adjusted to zero. Hence it is desirable that when the control valve 28 is in the neutral position as shown in FIGURE 2, the hydraulic connections to the motors 24, 25 be hydraulically by-passed. From FIGURE 2 it will be seen that when the control valve 28 is in the neutral position the motor ports 37, 38 are in by-pass relation. Motor port 37 communicates with motor port 38 through circumferential groove 44, annular groove 31, low pressure passages 35' and 35, circumferential groove 46, and annular groove 32. The passage 35 also continues to communicates with the low pressure or fluid return side of the fluid power-take-off means of the hydromechanical power transmission 19. This permits the low pressure side of the fluid power-take-off means of the hydromechanical power transmission 19 to supply make-up fluid resulting from fluid leakage in the motors 24, 25, control valve 28 and associated conduits. Thus the hydrostatic drive system for driving the front wheels 13, 14 is always filled with hydraulic fluid.

Now if the vehicle 10 is mired or the ground condition is such that insufficient traction is obtained from normal drive of the rear wheels 11, 12 in the forward direction, the operator shifts the control lever 47 to the position illustrated in FIGURE 3 wherein the plunger 39 of the control valve 28 is moved rightwardly. In this position the high pressure inlet passage 33 leading from the high pressure side of the fluid power-take-off means in the hydromechanical transmission 19 communicates with motor port 38 through the annular groove 32 and the circumferential groove 45 as shown. Since the conduits 26, 26' connects with the motor port 38 and the hydraulic motors 24, 25, the motors 24, 25 are thus energized to drive the front wheels 13, 14 in the forward direction. Fluid at low pressure discharging from the motors 24, 25 is conducted to motor port 37 through conduits 27 and 27'. In turn the low pressure return fluid entering motor port 37 is returned to the inlet side of the fluid power-take-off means of the hydromechanical power transmission 19 through annular groove 31, passages 35' and 35, and conduit 36 as indicated. From this it will be apparent that the front wheels 13, 14 as well as the rear wheels 11, 12 of the vehicle 10 are in drive relation with respect to the power plant 15.

When the vehicle 10 is moving in the reverse direction and the operator desires to drive the front wheels 13, 14 in the reverse direction, he merely shifts the control lever 47 of the control valve 28 to the position illustrated in FIGURE 4. This communicates the high pressure fluid inlet 33 with the motor port 37 through the circumferential groove 45 and annular groove 31. Thus fluid at high pressure from the fluid power-take-off means of the hydromechanical power transmission 19 is communicated to the hydraulic motors 24, 25 through conduit 34, control valve 28 and conduits 27' and 27 thereby energizing the motors 24, 25 in the reverse direction. Driving such reverse direction operation fluid return at low pressure from the motors 24, 25 is through conduits 26, 26' into motor port 38, thence to conduit 36 through annular groove 32 and passage 35 and thereafter through conduit 36 to the low pressure side of the fluid power-take-off means of the transmission 19.

From the foregoing it will be appreciated that the operator has the option of propelling the vehicle 10 conventionally through the rear wheels 11, 12 employing a hydromechanical power transmission 19 (i.e., 2-wheel drive) or propelling the vehicle 10 through the rear wheels 11, 12 and the front wheels 13, 14 (i.e., 4-wheel drive).

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. A self-propelled vehicle combination having a power plant and including at least one first ground-engaging element and at least one second ground-engaging element, an infinitely variable speed ratio reversible hydromechanical power transmission unit having a power input shaft drivenly connected to said power plant and a power output shaft drivingly connected to said first ground-engaging element, said transmission unit comprising a housing with a multicylinder hydraulic pump drivenly connected to said power input shaft, said pump having a mechanical force reacting means positioned for transmitting mechanically at least a portion of the power from said power input shaft to said power output shaft, a multicylinder hydraulic motor drivingly connected to said power output shaft, said transmission unit having hydraulic connecting means for communicatively connecting said pump with said motor for hydraulically transmitting power from said power input shaft to said power output shaft in parallel relation with power transmitted by said mechanical force reacting means, said hydromechanical power transmission unit having a source of fluid pressure power-take-off in said hydraulic connecting means, a second hydraulic motor drivingly connected to said second ground-engaging element, second hydraulic connecting means communicatively connecting said second hydraulic motor to said source of fluid pressure power-take-off of said hydromechanical power transmission unit, and adjustable means in said second connecting means for establishing reverse flow to said second motor whereby said power plant energizes said hydromechanical power transmission unit to drive hydromechanically said first ground engaging element and hydrostatically drive said second ground-engaging element for propelling said vehicle in a forward or reverse direction depending upon the position of said adjustable means.

2. A self-propelled vehicle combination having a power plant and including a pair of first ground-engaging wheels and a pair of second ground-engaging wheels, an infinitely variable speed ratio reversible hydomechanical power transmission unit having a power input shaft drivenly connected to said power plant and a power output shaft drivingly connected to said pair of first ground-engaging wheels, said transmission unit comprising a housing with a multicylinder hydraulic pump drivenly connected to said power input shaft, said pump having a mechanical force reacting means positioned for transmitting mechanically at least a portion of the power from said power input shaft to said power output shaft, a multicylinder hydraulic motor drivingly connected to said power output shaft, said transmission unit having hydraulic connecting means for communicatively connecting said pump with said motor for hydraulically transmitting power from said power input shaft to said power output shaft in parallel relation with power transmitted by said mechanical force reacting means, said hydromechanical power transmission unit having a source of fluid pressure power-take-off in said hydraulic connecting means, at least one second hydraulic motor drivingly connected to said second pair of ground engaging wheels, second hydraulic connecting means communicatively connecting said second hydraulic motor to said source of fluid pressure power-take-off of said hydromechanical power transmission unit, and adjustable means in said second connecting means for establishing reverse flow to said second motor whereby said power plant energizes said hydromechanical power transmission unit to drive hydromechanically said first pair of ground-engaging wheels and hydrostatically drive said second pair of ground-engaging wheels for propelling said vehicle in a forward or reverse direction depending upon the position of said adjustable means.

3. A self-propelled vehicle combination having a power plant and including a pair of first ground-engaging wheels and a pair of second ground-engaging wheels, an infinitely variable speed ratio reversible hydromechanical power transmission unit having a power input shaft drivenly connected to said power plant and a power output shaft drivingly connected to at least one of said pair of first ground-engaging wheels, said transmission unit comprising a housing with a multicylinder hydraulic pump drivenly connected to said power input shaft, said pump having a mechanical force reacting means positioned for transmitting mechanically at least a portion of the power from said power input shaft to said power output shaft, a multicylinder hydraulic motor drivingly connected to said power output shaft, said transmission unit having hydraulic connecting means for communicatively connecting said pump with said motor for hydraulically transmitting power from said power input shaft to said power output shaft in parallel relation with power transmitted by said mechanical force reacting means, said hydromechanical power transmission unit having a source of fluid pressure power-take-off in said hydraulic connecting means, second hydraulic motor means connected in drive relation with at least one of said pair of second ground-engaging wheels, second hydraulic connecting means communicatively connecting said second hydraulic motor means to said source of fluid pressure power-take-off of said hydromechanical power transmission unit, a control valve interposed in said second connecting means for selectively operating said second hydraulic motor means, and adjustable means in said second connecting means for establishing reverse flow to said second motor means whereby said power plant energizes said hydromechanical power transmission unit to drive hydromechanically at least one of said pair of first ground-engaging wheels for propelling said vehicle while said second hydraulic motor means is de-energized, and alternately said power plant energizes said hydromechanical power transmission unit to drive hydromechanically at least one of said pair of first ground-engaging wheels and simultaneously energize said second hydraulic motor means to drive of said pair of second ground-engaging wheels in a forward or reverse direction depending upon the position of said adjustable means thereby increasing propelling traction of said vehicle with respect to the ground.

4. A self-propelled vehicle combination according to claim 3 wherein said second hydraulic motor means when de-energized is communicatively connected in by-pass relation by said control valve so that each of said pair of second ground-engaging wheels is freely rotatable.

5. A self-propelled vehicle combination according to claim 3 wherein said control valve and said adjustable means are selectively operable to energize said second hydraulic motor means in one direction and alternately operable to energize said second motor means in the opposite direction whereby at least one of said pair of second ground-engaging wheels is selectively driven in the forward direction and alternately driven in the reverse direction.

6. A self-propelled vehicle having a power plant and including a pair of rear ground engaging wheels and a pair of front ground-engaging wheels, said vehicle having an infinitely variable speed ratio reversible hydromechanical power transmission unit, said transmission unit having a power input shaft drivenly connected to said power plant and a power output shaft drivenly connected to said pair of rear ground-engaging wheels, said transmission unit comprising a housing with a multicylinder hydraulic pump drivenly connected to said power input shaft, said pump having a mechanical force reacting means positioned for transmitting mechanically at least a portion of the power from said power input shaft to said power output shaft, a multicylinder hydraulic motor drivingly connected to said power output shaft, said transmission unit having hydraulic connecting means for communicatively connecting said pump with said motor for hydraulically transmitting power from said power input shaft to said power output shaft in parallel relation with power transmitted by said mechanical force reacting means, said hydromechanical power transmission unit having a source of fluid pressure power-take-off in said hydraulic connecting means, the combination with said vehicle of hydrostatic means for driving at least one of said pair of front ground-engaging wheels to increase propelling traction of said vehicle comprising a second hydraulic motor means drivingly connected to said pair of front ground-engaging wheels, second hydraulic connecting means communicatively connecting said second hydraulic motor means with said source of fluid pressure power-take-off of said hydromechanical power transmission unit, and adjustable means in said second connecting means for establishing reverse flow to said second motor means whereby said power plant energizes said hydromechanical power transmission unit to drive hydromechanically at least one of said pair of rear ground-engaging wheels and hydrostatically drive at least one of said pairs of front ground-engaging wheels for propelling said vehicle in a forward or reverse direction depending upon the position of said adjustable means.

7. A self-propelled vehicle having a power plant and including a pair of rear ground-engaging wheels and a pair of front ground-engaging wheels, said vehicle having an infinitely variable speed ratio reversible hydromechanical power transmission unit, said transmission unit having a power input shaft drivenly connected to said power plant and a power output shaft drivingly connected to said pair of rear ground-engaging wheels, said transmission unit comprising a housing with a multicylinder hydraulic pump drivenly connected to said power input shaft, said pump having a mechanical force reacting means positioned for transmitting mechanically at least a portion of the power from said power input shaft to said power output shaft, a multicylinder hydraulic motor drivingly connected to said power output shaft, said transmission unit having hydraulic connecting means for communicatively connecting said pump with said motor for hydraulically transmitting power from said power input shaft to said power output shaft in parallel relation with power transmitted by said force reacting means, said hydromechanical power transmission unit having a source of fluid pressure power-take-off in said hydraulic connecting means, the combination with said vehicle of hydrostatic means for driving at least one of said pair of front ground-engaging wheels to increase propelling traction of said vehicle comprising a second hydraulic motor means drivingly connected to each of said pair of front ground-engaging wheels, second hydraulic connecting means communicatively connecting said second hydraulic motor means with said source of fluid pressure power-take-off of said hydromechanical power transmission unit, a control valve interposed in said second connecting means for selectively operating said second hydraulic motor means, and adjustable means in said second connecting means for establishing reverse flow to said second motor means whereby said power plant energizes said hydromechanical power transmission unit to drive at least one of said pair of rear ground-engaging wheels from said power output shaft for propelling said vehicle while said second hydraulic motor means is de-energized, and alternately said power plant energizes said hydromechanical power transmission unit to drive at least one of said pair of rear ground-engaging wheels from said power output shaft for propelling said vehicle and simultaneously energizes said second hydraulic motor means from said source of fluid pressure power-take-off of said hydromechanical power transmission unit to drive at least one of said pair of front ground-engaging wheels in a forward or reverse direction depending upon the position of said adjustable means thereby increasing propelling traction of said vehicle with respect to the ground.

8. A self-propelling vehicle combination according to claim 7 wherein said second hydraulic motor means when de-energized is communicatively connected in by-pass relation by said control valve so that each of said pair of front ground-engaging wheels is freely rotatable.

9. A self-propelled vehicle combination according to claim 7 wherein said control valve and said adjustable means are selectively operable to energize said second hydraulic motor means in one direction and alternately operable to energize said second motor means in the opposite direction whereby at least one of said pair of front ground-engaging wheels is selectively driven in the forward direction and alternately driven in the reverse direction.

References Cited
UNITED STATES PATENTS 3,151,456  10/1964  Swift _____ 60—53
3,261,421  7/1966  Forster et al. _____ 180—66 X A. HARRY LEVY, *Primary Examiner.*